United States Patent
Saimani et al.

(10) Patent No.: US 11,550,814 B1
(45) Date of Patent: Jan. 10, 2023

(54) PAGINATION PROCESSING AND DISPLAY OF DATA SETS

(71) Applicant: Intuit Inc., Mountain View, CA (US)

(72) Inventors: Jayanth Saimani, Bangalore (IN); Shikha Gupta, Bengaluru (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/496,630

(22) Filed: Oct. 7, 2021

(30) Foreign Application Priority Data

Jul. 30, 2021 (IN) .............................. 202141034348

(51) Int. Cl.
| | |
|---|---|
| *G06F 17/30* | (2006.01) |
| *G06F 16/25* | (2019.01) |
| *G06F 3/0485* | (2022.01) |
| *G06F 16/28* | (2019.01) |
| *G06F 3/0483* | (2013.01) |

(52) U.S. Cl.
CPC .......... *G06F 16/258* (2019.01); *G06F 3/0483* (2013.01); *G06F 3/0485* (2013.01); *G06F 16/252* (2019.01); *G06F 16/284* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 8,566,693 | B2 * | 10/2013 | Beauchamp | G06F 16/957 715/201 |
| 10,539,787 | B2 * | 1/2020 | Haddick | G06F 3/0428 |
| 2014/0139537 | A1 * | 5/2014 | Ghosh | G06F 3/14 345/547 |
| 2014/0157370 | A1 * | 6/2014 | Plattner | H04L 63/06 726/4 |
| 2014/0310232 | A1 * | 10/2014 | Plattner | G06F 16/24539 707/602 |
| 2014/0344666 | A1 * | 11/2014 | Bleakley | G06F 16/9574 715/234 |
| 2015/0188572 | A1 * | 7/2015 | Silberman | H03M 13/1545 714/781 |
| 2016/0275178 | A1 * | 9/2016 | Liu | G06F 16/319 |

* cited by examiner

*Primary Examiner* — Hung D Le
(74) *Attorney, Agent, or Firm* — Ferguson Braswell Fraser Kubasta PC

(57) ABSTRACT

A method including receiving a request for a report on a data set. The method also includes providing the report. The report includes a macro page having a subset of the data set. The method also includes converting the macro page into a primary tree data structure having levels. The method also includes buffering the primary tree data structure in a buffer to form a buffered tree data structure. The buffered tree data structure is buffered in a level order of the levels. The method also includes selecting a first micro page from the buffered tree data structure. The first micro page is configured for display on a user interface. The method also includes transmitting, to the user interface, the first micro page.

20 Claims, 7 Drawing Sheets

| Cache ID (602) | Page (604) | Data (606) |
|---|---|---|
| 1 | 1 | { ("id":"Expenses", "txn_type":"Expenses", "Amount":"300"), ("id":"Invoice", "txn_type":"Invoice", "Amount":"700"), } |
| 1 | 2 | { ("id":"Bill", "txn_type":"Bill", "Amount":"1100"), ("id":"1", "txn_type":"Expenses", "Amount":"100"), } |
| 1 | 3 | { ("id":"2", "txn_type":"Expenses", "Amount":"200"), ("id":"3", "txn_type":"Invoice", "Amount":"300"), } |
| 1 | 4 | { ("id":"4", "txn_type":"Invoice", "Amount":"400"), ("id":"5", "txn_type":"Bill", "Amount":"500"), } |
| 1 | 5 | { ("id":"6", "txn_type":"Bill", "Amount":"600") } |

| Cache ID (702) | RowNum (704) | Parent (706) | Id (708) | Cells (710) |
|---|---|---|---|---|
| 1 | 1 | null | 1 | txn_type: Expenses, amount: 300 |
| 1 | 2 | null | 2 | txn_type: Invoice, amount: 700 |
| 1 | 3 | null | 3 | txn_type: Bill, amount: 1100 |
| 1 | 4 | 1 | 1.1 | "tx_id":"1", "txn_type":"Expenses", "Amount":"100" |
| 1 | 5 | 1 | 1.2 | "tx_id":"2", "txn_type":"Expenses", "Amount":"200" |
| 1 | 6 | 2 | 2.1 | "tx_id":"3", "txn_type":"Invoice", "Amount":"300" |
| 1 | 7 | 2 | 2.2 | "tx_id":"4", "txn_type":"Invoice", "Amount":"400" |
| 1 | 8 | 3 | 3.1 | "tx_id":"5", "txn_type":"Bill", "Amount":"500" |
| 1 | 9 | 3 | 3.2 | "tx_id":"6", "txn_type":"Bill", "Amount":"600" |

PAGINATION PROCESSING AND DISPLAY OF DATA SETS

RELATED APPLICATIONS

This application claims priority to Indian Patent Application 202141034348, filed Jul. 30, 2021, the entirety of which is hereby incorporated by reference.

BACKGROUND

As used herein, a "large data set" is a data set which cannot be displayed practically as a single data set on a single display screen, or which cannot be processed by a selected processor within a pre-determined time period. In some cases, a computer will be unable to display the large data set, and/or the computer may experience undesirable delays in calculating the pagination or scrolling for the large data set, leading to user dissatisfaction.

SUMMARY

The one or more embodiments include a method. The method includes receiving a request for a report on a data set. The method also includes providing the report. The report includes a macro page having a subset of the data set. The method also includes converting the macro page into a primary tree data structure having levels. The method also includes buffering the primary tree data structure in a buffer to form a buffered tree data structure. The buffered tree data structure is buffered in a level order of the levels. The method also includes selecting a first micro page from the buffered tree data structure. The first micro page is configured for display on a user interface. The method also includes transmitting, to the user interface, the first micro page.

The one or more embodiments also provides for a system. The system includes a processor and a memory. The memory includes a buffer, in communication with the processor. The memory also includes a buffered tree data structure having a primary tree data structure with levels. The buffered tree data structure is buffered in a level order of the levels. The system also includes a data repository, in communication with the processor. The data repository includes a report including a macro page including a subset of a data set. The data repository also includes a first micro page formed from the buffered tree data structure. The first micro page is configured for display on a user interface. The system also includes a pagination engine configured to receive a request for the report on a data set. The pagination engine is also configured to provide the report and convert the macro page into the primary tree data structure. The pagination engine is also configured to buffer the primary tree data structure in the buffer to form the buffered tree data structure. The pagination engine is also configured to select the first micro page from the buffered tree data structure. The pagination engine is also configured to transmit, to a user interface, the first micro page.

A non-transitory computer readable storage medium storing program code which, when executed by a processor, performs a computer-implemented method. The computer-implemented method includes receiving a request for a report on a data set. The computer-implemented method also includes providing the report. The report includes a macro page including a subset of the data set. The computer-implemented method also includes converting the macro page into a primary tree data structure having levels. The computer-implemented method also includes buffering the primary tree data structure in a buffer to form a buffered tree data structure. The buffered tree data structure is buffered in a level order of the levels. The computer-implemented method also includes selecting a first micro page from the buffered tree data structure. The first micro page is configured for display on a user interface. The computer-implemented method also includes transmitting, to the user interface, the first micro page.

Other aspects of the one or more embodiments will be apparent from the following description and the appended claims.

BRIEF DESCRIPTION OF DRAWINGS

FIG. 6 and FIG. 7 show data structures useable to store the tree data structure shown in FIG. 5.

DETAILED DESCRIPTION

Figure 1:
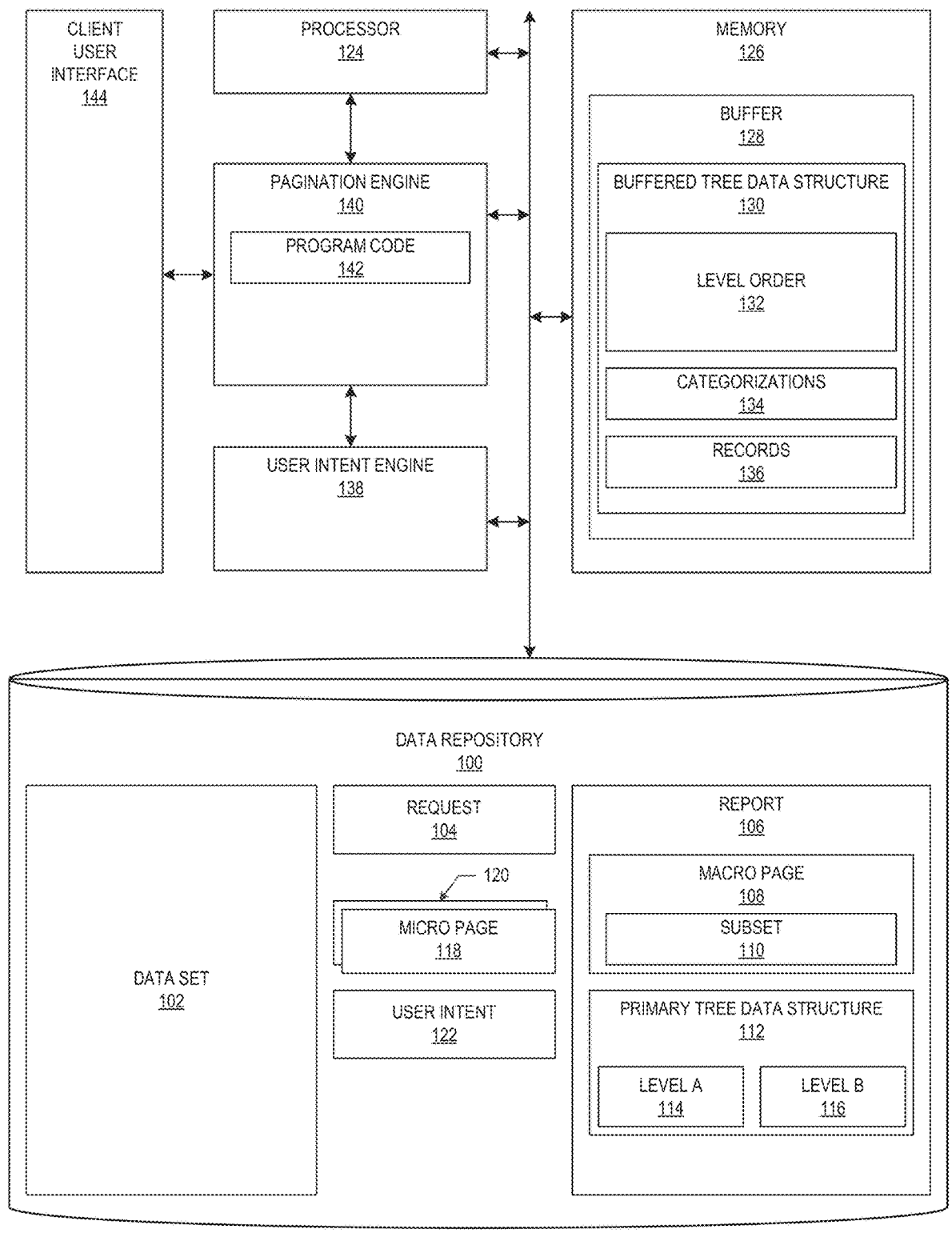
FIG. 1 shows a computing system, in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term "connected to" contemplates multiple meanings. A connection may be direct or indirect. For example, computer A may be directly connected to computer B by means of a direct communication link. Computer A may be indirectly connected to computer B by means of a common network environment to which both computers are connected. A connection may be wired or wireless. A connection may be temporary, permanent, or semi-permanent communication channel between two entities. An entity is an electronic device, not necessarily limited to a computer.

In general, the one or more embodiments relate to the computerized generation of renderable reports from large data sets. In some cases, the data set is sufficiently large that even a report in the form of a subset of the large data set cannot be processed quickly enough to achieve user satisfaction. In other cases, the report is too large to be displayed in an effective manner on a limited screen size. In still other cases, the client side computer may have limited memory which is effectively incapable of storing the report. Furthermore, network bandwidth may be a concern when the report is to be transported over a communication link, such as email or via a network.

The one or more embodiments are directed to one or more technical solutions to the above-described technical problems by providing a method for the transmission and electronic rendering of reports from large data sets. In summary, the one or more embodiments convert the report into a primary tree data structure having multiple levels. The primary tree data structure is arranged in multiple levels and then buffered to form a buffered tree data structure. Based on a user query, request, and/or intent, a portion of the buffered tree data structure is accessed and transmitted and/or displayed on the client computer. The portion of the buffered tree data structure is referred-to as a micro page. The micro page is of a size which satisfies technological limitations with respect to processing speed, network bandwidth, screen size, and available memory of the client computer. As a client user continues to review a report, additional micro pages are generated from the buffered tree data structure and transmitted to the client device on an ongoing basis.

Attention is now turned to the figures. FIG. 1 shows a computing system, in accordance with one or more embodiments. The computing system includes a data repository (100). In one or more embodiments, the data repository (100) is a storage unit and/or device (e.g., a file system, database, collection of tables, or any other storage mechanism) for storing data. Further, the data repository (100) may include multiple different storage units and/or devices. The multiple different storage units and/or devices may or may not be of the same type and may or may not be located at the same physical site. In an embodiment, the The data repository (100) stores a data set (102). The data set (102) is a large data set. Again, a "large data set" is a data set which cannot be displayed practically as a single data set on a single display screen, or which cannot be processed by a selected processor within a pre-determined time period. An example of the data set (102) may be the financial information for a large company having thousands of employees and billions of dollars in revenue. Another example of the data set (102) may be data for a small to medium sized business, but which, due to client-side technological hardware limitations, is treated as a "large data set." Another example of the data set (102) may be a relational database from which the primary tree data structure (112) (described below) may be built.

The data repository (100) also stores a request (104). The request (104) is a query or other request for information pertaining to the data set (102). The request (104) may be received from a client device, such as from a client user interface (144) described below. The request (104) may be a complex request, such as to sort and collate data in a particular requested format, or may be a simple request to present a portion of the data set (102).

The data repository (100) also stores a report (106). The report (106) is a portion of the data set (102), but may be the entire data set (102) in some embodiments. The report (106) satisfies the requirements of the request (104).

The report (106) is returned in the form of a macro page (108). A macro page (108) is a substantial portion of the report (106), such as all or most of the rows of a table that includes all of the data in the report (106). The term "substantial portion" in the present context means that the macro page (108) is still considered to be a "large data set." The macro page (108) may be all of the report (106), or may be less than all of the report (106). Thus, the macro page (108) may be a subset (110) of the report (106) (i.e., less than all of the report (106)). For example, the subset (110) could be a selection of rows and/or columns taken from the macro page (108), with the macro page (108) taken in turn from the report (106).

The data repository (100) also stores a primary tree data structure (112). The primary tree data structure (112) is a tree data structure that contains all of the data and metadata required to generate the report (106) and/or the macro page (108).

A tree data structure is an electronic data organization arrangement. A tree data structure can be defined as a collection of nodes (starting at a root node), where each node is a data structure having a value, together with a list of references to other nodes (the "children" nodes). Alternatively, a tree data structure can be defined as an ordered tree of electronically related data, with values assigned to each node. Connections between nodes may be referred-to as edges. The edges may also contain data and/or metadata that describe the relationships between the nodes. Together, the set of nodes and edges contain the information in the macro page (108).

Figure 5:
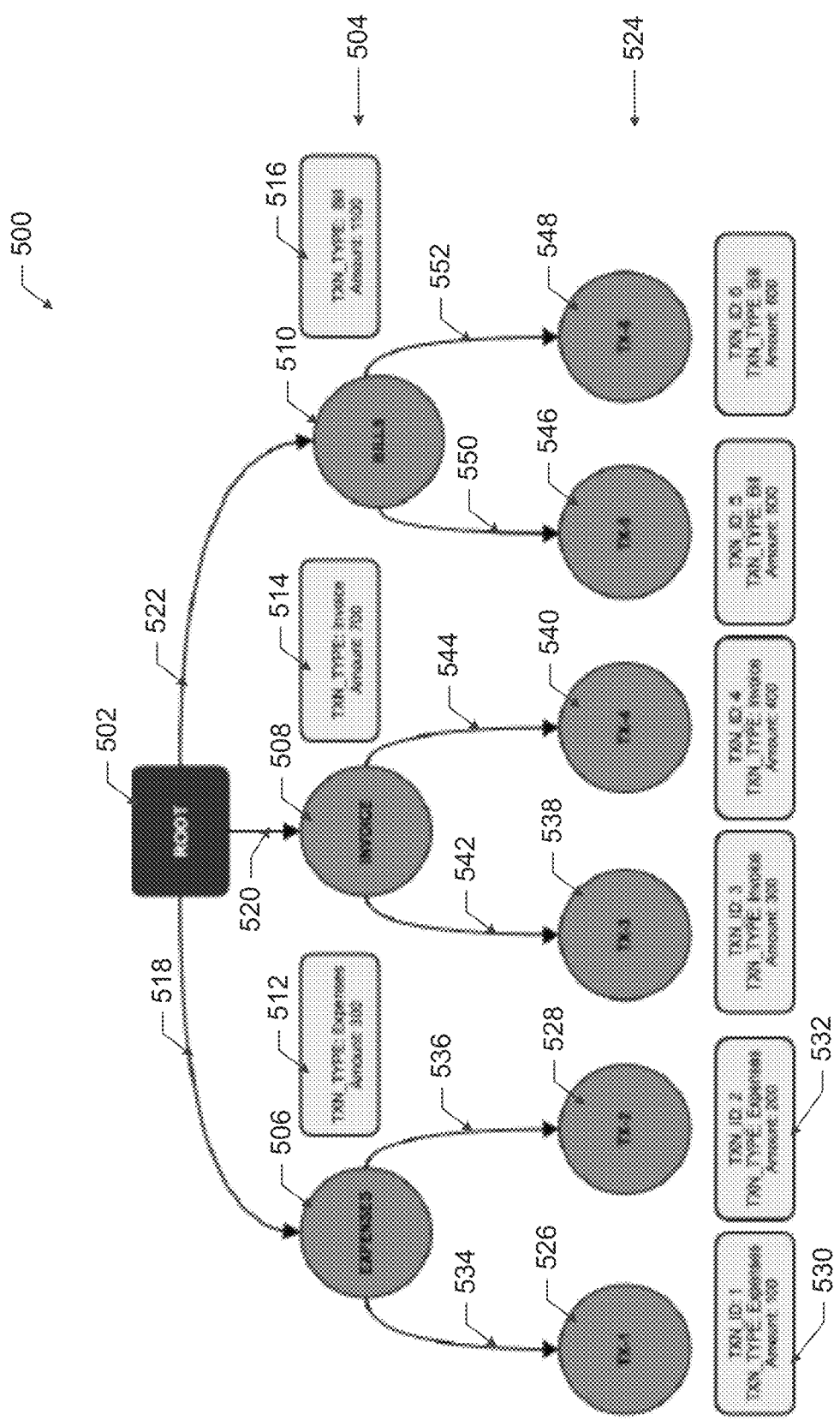
FIG. 5 shows a tree data structure, in accordance with one or more embodiments.

In an embodiment, the primary tree data structure (112) may be organized into levels, such as level A (114) and level B (116). A level is an organizational arrangement of the data structure in which data of a certain type is arranged at a level within the primary tree data structure (112). An example of a tree data structure having levels is shown in FIG. 5. Not all tree data structures need be organized into levels. However, in the one or more embodiments when the primary tree data structure (112) is organized into levels each level represents an organization arrangement of data within the data structure. For example, the level A (114) may store information relating to data categories and the level B (116) may store information relating to instances of the data categories. Again, an example of the levels within a tree data structure is shown with respect to FIG. 5.

The data repository (100) may also store a micro page (118) among possibly multiple micro pages (120). The micro page (118) is a selected portion of the macro page (108). The micro page (118) has a data size that satisfies the hardware, software, and/or bandwidth limitations of the client-side user device (e.g., the computer that operates the client user interface (144)). The micro page (118) is selected from the buffered tree data structure (130), described further below. The multiple micro pages (120) are provided as needed based on user behaviors or intent (e.g., scrolling down a page, further requesting a particular line item, etc.). Thus, by providing the multiple micro pages (120), the macro page (108) can be presented in a continuous manner while maintaining the integrity of the primary tree data structure (112).

The data repository (100) may store the user intent (122). The user intent (122) is an electronic, automatically generated description of how the user desires to view the data in the report (106), or the format in which the user desires to view the data in the report (106). The user intent (122) is generated using the user intent engine (138), described below. Generation of the user intent (122) is described with respect to FIG. 2.

The system shown in FIG. 1 includes other components, such as a processor (124). The processor (124) is a hardware processor or a logical processor operated by a provider of the system shown in FIG. 1. Thus, for example, the processor (124) may be part of a server computer. The processor (124) may take the form of multiple processors in a possibly distributed computing environment.

The system shown in FIG. 1 also includes a memory (126). The memory (126) is a hardware memory, such as random access memory (RAM), flash memory, or some other form of memory that may be quickly accessed by the processor (124).

The memory (126) includes a buffer (128). A buffer (128) is a dedicated portion of the memory (126), such as for example a memory range within the memory (126). The buffer (128) is thus a region of a physical memory storage used to temporarily store data while the data is being moved from one place to another. Typically, the data is stored in a buffer as it is retrieved from an input device (such as the data repository (100) and/or the client user interface (144)) or just before it is sent to an output device (such as the processor (124)). However, a buffer may be used when moving data between processes within a computer.

When the one or more embodiments are in use, the buffer (128) stores a buffered tree data structure (130). The buffered tree data structure (130) is the primary tree data structure (112), but moved from the data repository (100) to the buffer (128) in the memory (126). Thus, the buffered tree data structure (130) has the levels, such as the level A (114) and the level B (116) described above.

In an embodiment, the buffered tree data structure (130) may be a portion of the primary tree data structure (112). In another embodiment, the buffered tree data structure (130) may be written directly into the buffer (128).

The buffered tree data structure (130) may have a level order (132). The level order (132) is an order in which the levels of the buffered tree data structure (130) are organized. For example, the level order (132) may specify that the level A (114) is in a higher level than the level B (116). In the example of FIG. 5, a higher level order is the "transaction types" and a lower level in the level order are the "transactions."

Thus, for example, the buffered tree data structure (130) may include categorizations (134). The categorizations (134) are nodes in the buffered tree data structure (130). However, the categorizations (134) are at a higher order within the level order (132) with respect to the records (136) of the buffered tree data structure (130). For example, the categorizations (134) store data that describes the category headings for the records (136). In turn, the records (136) are the leaf data nodes that store specific information of interest. Referring to the example of FIG. 5, the first level of nodes extending from the root are examples of the categorizations (134), and the second level of nodes extending from the first level of nodes are examples of the records (136). However, the definition of the categorizations (134) and the records (136) is that both are at least nodes within the buffered tree data structure (130). Information regarding the categorizations (134) and the records (136), and/or the organization of the categorizations (134) and the records (136), may also be stored in the form of the edges of the buffered tree data structure (130).

The system shown in FIG. 1 optionally includes a user intent engine (138). The user intent engine (138) program code that takes the form of a set of machine-readable rules and policies, and/or a one or more machine learning models. The input to the user intent engine (138) is information in the request (104) and/or information collected from the client user interface (144). The output of the user intent engine (138) is a set of constraints that are applied to the generation of the micro page (118) and/or the multiple micro pages (120) from the buffered tree data structure (130). For example, user intent engine (138) may monitor the client user interface (144) to identify when a user is attempting to scroll past the micro page (118). As a result, the user intent engine (138) causes the pagination engine (140) (described below) to generate a next micro page in the multiple micro pages (120) from the buffered tree data structure (130), and then cause the next micro page to be displayed on the client user interface (144).

The system shown in FIG. 1 also includes a pagination engine (140). The pagination engine (140) is program code (142). The program code (142) is machine-readable instructions executable by the processor (124) to perform the method described with respect to FIG. 2.

The system shown in FIG. 1 interacts with a client user interface (144). The client user interface (144) is a graphical user interface and/or a display device associated with a client-side computer. The term "client-side" computer refers to the computer upon which the micro page (118) and/or the multiple micro pages (120) are to be displayed. The client user interface (144) and/or the client-side computer that supports the client user interface (144) is subject to the hardware limitations that cause the data set (102) to be considered a "large data set."

Note that the client user interface (144) may or may not be supported by the same organization that supports the system shown in FIG. 1. For example, the client user interface (144) may be generated by a computer operated by a user that subscribes to a data service offered by a large organization that maintains the system shown in FIG. 1. However, the client user interface (144) may be part of a computer also owned and operated by that large organization, but which is being used as a workstation to access the data set (102). Accordingly, the client user interface (144) may be, but is not necessarily, part of the system shown in FIG. 1.

While FIG. 1 shows a configuration of components, other configurations may be used without departing from the scope of the one or more embodiments. For example, various components may be combined to create a single component. As another example, the functionality performed by a single component may be performed by two or more components.

Figure 2:
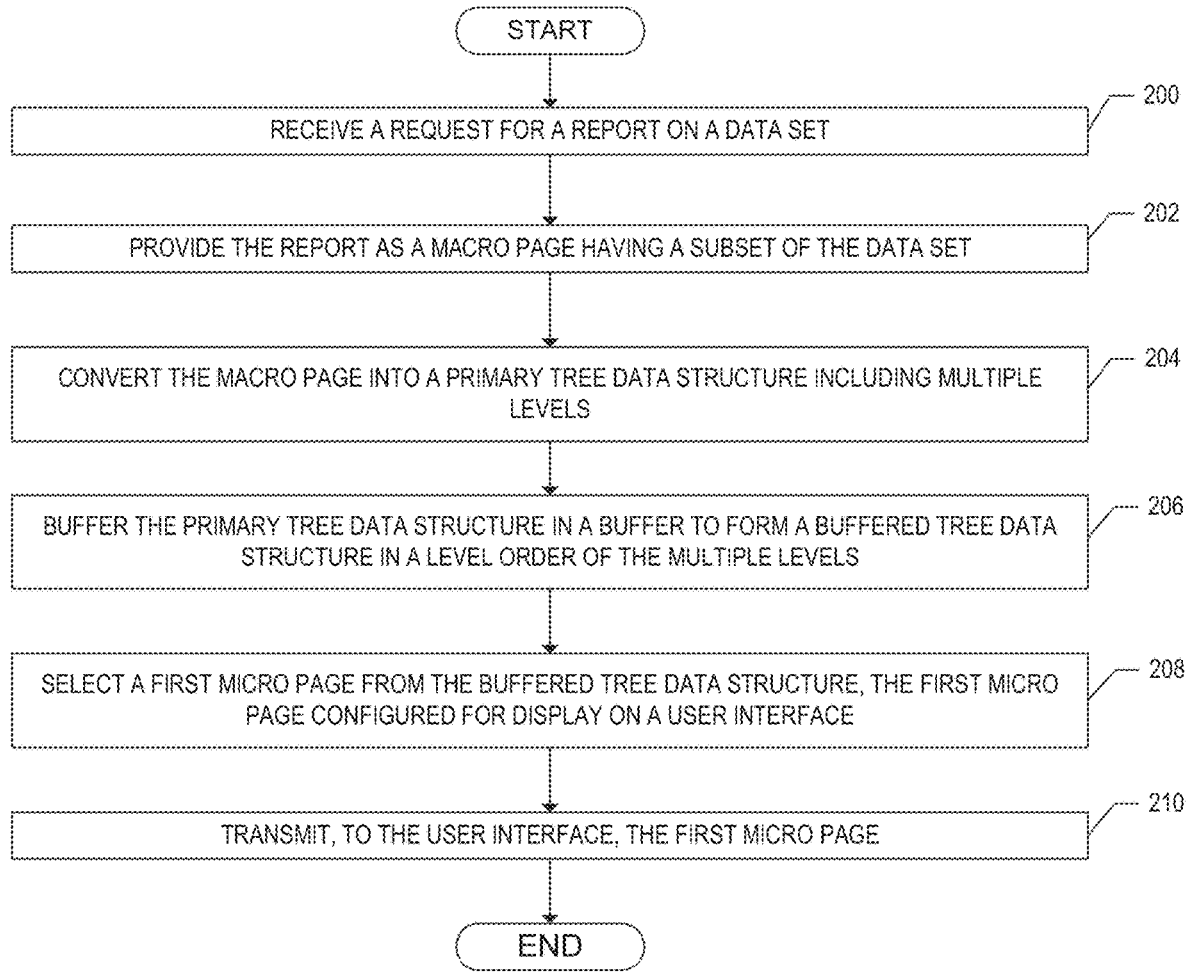
FIG. 2 shows a method, in accordance with one or more embodiments.

FIG. 2 shows a flowchart, in accordance with one or more embodiments. The method of FIG. 2 may be implemented using the system shown in FIG. 1. The computing system and network environment shown in FIG. 8A and FIG. 8B may also be used to implement the method of FIG. 2. The method of FIG. 2 is an example and thus does not necessarily limit other embodiments described herein.

Step 200 includes receiving a request for a report on a data set. The request may be received from a client user interface. For example, a user operating a remote laptop or workstation having limited hardware resources may request from a server a report that is considered, for that remote laptop or workstation, a "large data set." The request may be received at a pagination engine. Alternatively, the request may be received at some other application programming interface (API) or software application operated by the server, and then passed to the pagination engine. In still another embodiment, the request may be received from some other process executing on the server or from a third party computer.

Step 202 includes providing the report as a macro page having a subset of the data set. The macro page is provided within the server to the pagination engine as a result of processing the request. In the method of FIG. 2, the macro page is not provided to the client user interface or other client computer, as the macro page is considered a "large data set" that exceeds the hardware limitations of the requesting device.

Step 204 includes converting the macro page into a primary tree data structure including levels. The macro page is converted into the primary tree data structure by defining a root node and then converting data in the macro page into child nodes and edges between the child nodes. The root node may be defined by an identifier, such as an identifier assigned to the request. The child nodes are defined as both levels of categorization and as individual entries. The edges are the relationships between the levels of categorization and the individual entries. An example of such a primary tree data structure is shown in FIG. 5.

Another example of converting the macro page into the primary tree data structure is now provided. Converting begins with receiving multiple categorizations, the multiple categorizations being corresponding records from the data set. For example, for a request of financial information for a company, the multiple categorizations may be "vehicle expenses," "equipment expenses," etc. Thereafter, an identifier of the report is designated as a root of the primary tree data structure. The categorizations are designated as a first level of the tree data structure depending from the root. Then, the corresponding records are designated as a second level of the tree data structure depending from the categorizations (e.g., the expense charge for vehicle 1 is in a second level of the tree data structure under the first level of "vehicle expenses.") An example of the resulting tree data structure (either primary or buffered) is shown in FIG. 5.

Step 206 includes buffering the primary tree data structure in a buffer to form a buffered tree data structure in a level order of the multiple levels. Transferring primary tree data structure to the buffer is accomplished by moving the primary tree data structure from the data repository and into a faster form of memory, such as random access memory (RAM), or into some other form of memory which the processor can access more quickly. Faster processor access to the primary tree data structure is desirable, because as described below, selected portions of the buffered tree data structure will be fed to the client user interface only as needed in order to avoid overwhelming the hardware limitations of the client computing device.

The terms "primary" and "buffered", when used with "tree data structure" refer to the same data structure—the only difference being where the "tree data structure" is stored. Thus, for example, it is possible in some embodiments for the pagination engine to directly generate the buffered tree data structure by placing the generated tree data structure directly into the memory buffer of the sever computer executing the method of FIG. 2.

Step 208 includes selecting a first micro page from the buffered tree data structure, the first micro page configured for display on a user interface. The pagination engine selects the first micro page by selecting a portion of buffered tree data structure and transmitting that portion to the client user interface. The pagination engine selects which portion of the buffered tree data structure to send by one or more of a rule, a policy, and a user intent.

For example, a rule may be that the first micro page is a table representation of the first ten entries in a pre-selected category (e.g., the first ten transactions in a deposit transaction). In another example, a policy may be that client-side hardware data gathered via the client user interface will be used to determine the size of the first micro page. In yet another example, the user may specify which micro page will be displayed. In still another example, a user intent may be used to determine that the user intends to review a selected category and certain transactions within that category. In another example, a size of the subset is selected to be processed by a processor of the client user device within a predefined time period. In this manner, the user may perceive the receipt of information as being "fast" or "satisfactory," in the subjective estimation of the user.

The user intent may be determined by a user intent engine using a number of different techniques such as rules, policies, and/or machine learning. For example, the server-side system may prompt the user to provide hardware limitations combined with a questionnaire that indicates which types of information are of greater importance to be displayed first. In another example, a machine learning model can be used to calculate from the behavior of the user (or of similar users) over time an estimation of the type of information that the user is most likely to want to see first, or to estimate the form in which the user is most likely to want to see the desired information. In still another example, rules and/or policies may be used to evaluate which types of information to be returned first as the micro page, such as to provide certain information based on a user type (e.g., lay person or professional accountant) or user identifier (e.g., an administrator versus a worker). In any case, the user intent engine may be used in some embodiments to determine how the first micro page is selected.

Step 210 includes transmitting, to the user interface, the first micro page. The first micro page is transmitted from the pagination engine (or perhaps via an API or some other intervening software) to the client user interface. The first micro page is then displayed on the client user device, saved to the client user device, or otherwise consumed by a software process on the client user device.

The method of FIG. 2 may be varied. For example, in may cases the user will desire to see more information than can be displayed in the first micro page. Thus, the system may receive a request to display a second micro page from the macro page. To serve the request, the pagination engine retrieves, from the buffer, the second micro page from the buffered tree data structure. The second micro page is then transmitted on the client device.

The request to display the second micro page may take different forms. For example, an implied request may be generated when the user attempts to scroll past the first micro page on the user interface. The command to scroll past the first micro page automatically generates a request to generate the second micro page, and it is automatically determined that the next set of information in the sequence of data in the macro page is to form the content of the second micro page.

In another example, the pagination engine may receive a request from the client user interface to expand information displayed on the first micro page. For example, the user may request that more of a table to be displayed at once. To accomplish this request the pagination engine generates a second micro page from the buffered tree data structure in a manner described above, and then transmit the second micro page to the client user interface.

In still another example, the pagination engine may receive a request from the client user interface to directly access some aspect of the data held in the buffered tree data structure. In this case, the second macro page is generated by querying the requested information, generating the second macro page, and transmitting the second macro page to the client user device. Other means for generating the request to display the second micro page are contemplated.

While the various steps in the flowchart of FIG. 2 are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments. Thus, the one or more embodiments are not necessarily limited by the examples provided herein.

FIG. 3 through FIG. 7 present a specific example of the techniques described above with respect to FIG. 1 and FIG. 2. The following example is for explanatory purposes only and not intended to limit the scope of the one or more embodiments.

Figure 3:
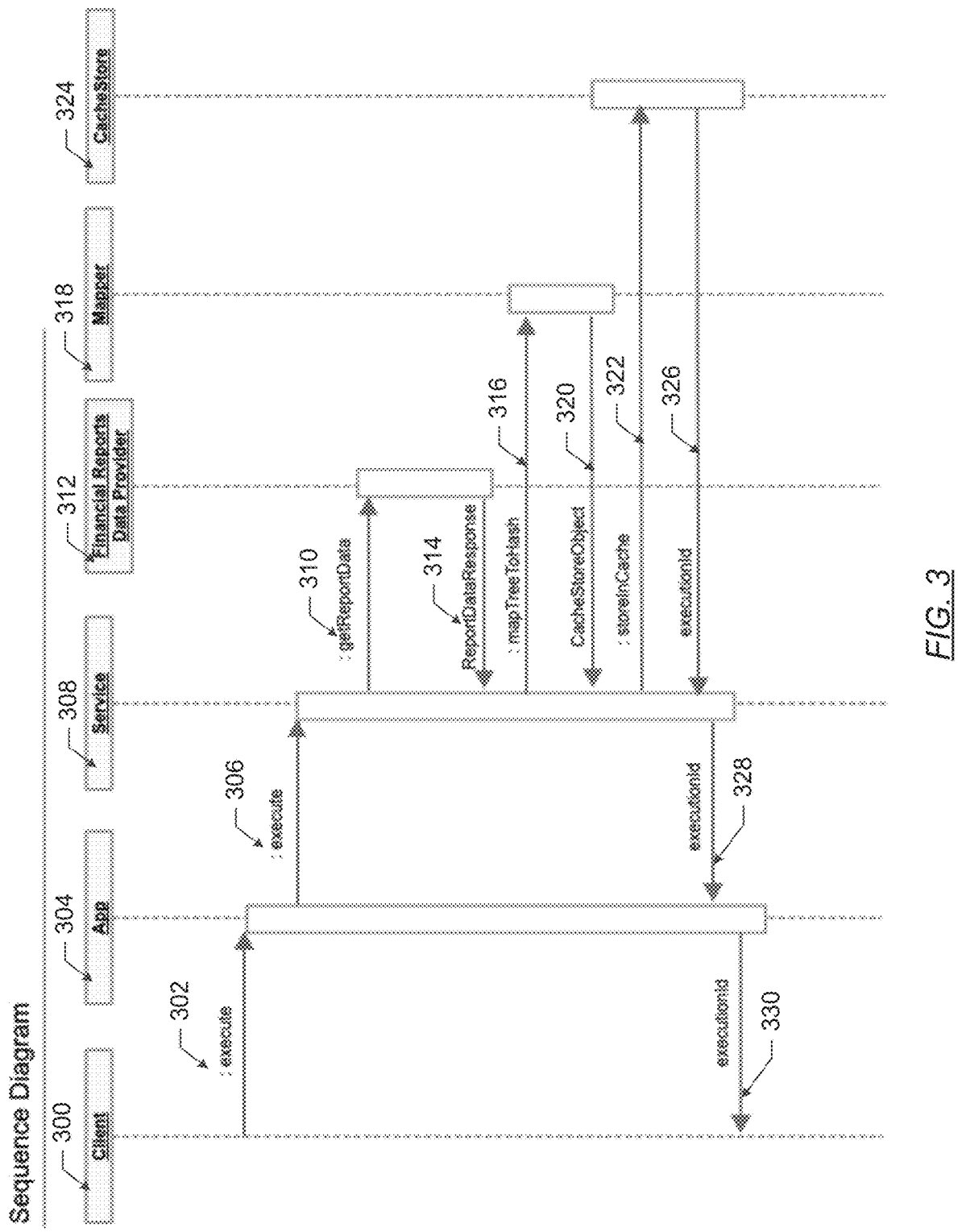
FIG. 3 shows a data sequence flow diagram, in accordance with one or more embodiments.

FIG. 3 shows a data sequence flow diagram, in accordance with one or more embodiments. The client (300) is the client-side computing device. Initially, the client (300) executes (302) an application (app (304)) which is used to access information in a large data set. The app (304) executes a request (306) for data to a service (308). The service (308) may be the pagination engine (140) of FIG. 1.

The service (308) submits a request for report data (310) to a financial reports data provider (312) (e.g., the data set (102) in FIG. 1). The financial reports data provider (312) returns a data response (314) to the service (308). The data response (314) is, for example, the macro page (108) in FIG. 1.

The service (308) then submits a map request (316) to a mapper (318). The mapper (318) may be a functionality of the pagination engine (140) of FIG. 1. The mapper (318) converts the data response (314) (i.e., the macro page (108) in FIG. 1) into a tree data structure. The mapper (318) then issues a cache store object command (320) back to the service (308). In turn, the service (308), issues a storage command (322) to cause the tree data structure to be stored in a cache store (324) (i.e., in a memory buffer).

The service (308) then retrieves a portion of the tree data structure (i.e., the micro page (118) of FIG. 1), as shown at arrow (326). The service (308) then returns the portion of the tree data structure to the app (304), as shown at arrow (328). In turn, the app (304) returns the portion of the tree data structure to the client (300), as shown at arrow (330).

Figure 4:
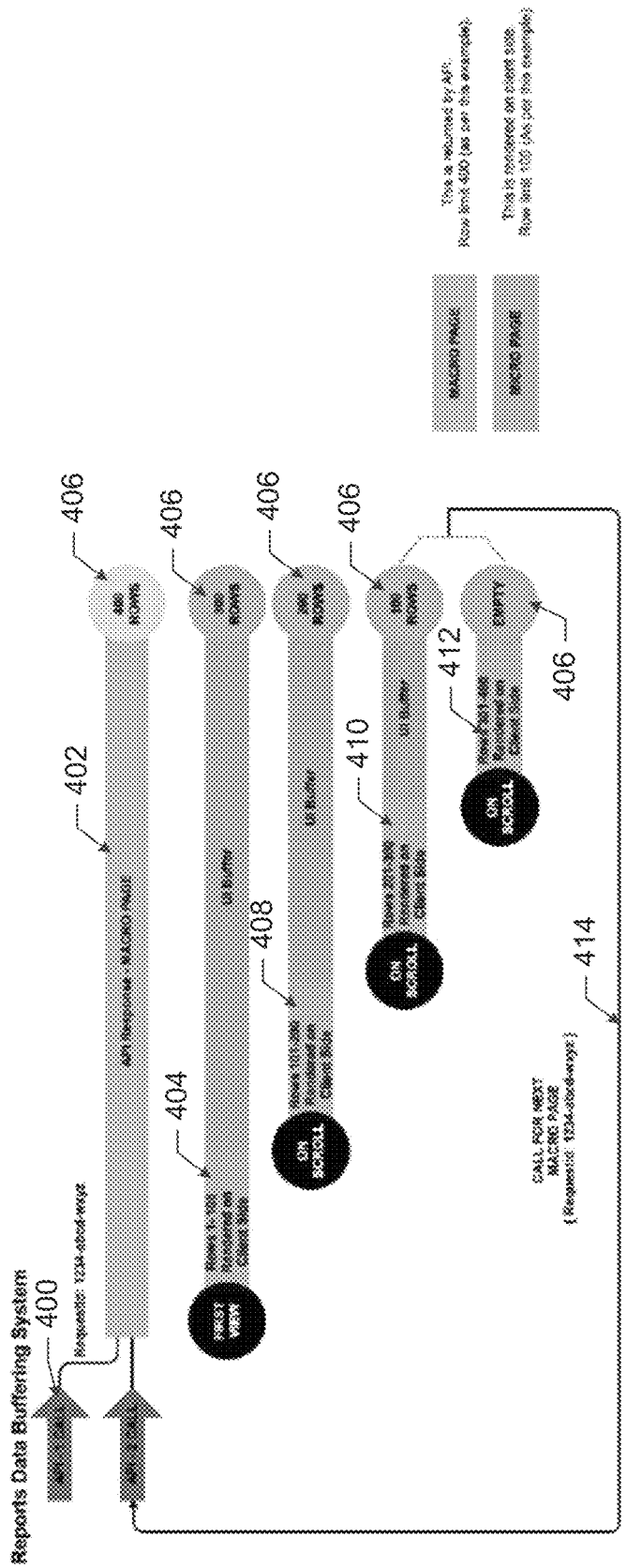
FIG. 4 shows a data report data buffering system, in accordance with one or more embodiments.

FIG. 4 shows a data report data buffering system, in accordance with one or more embodiments. FIG. 4 is an alternative presentation of the method of FIG. 2 and the data flow of FIG. 3. The example of FIG. 4 assumes that the hardware limitation is communication bandwidth, not necessarily the client computer's ability to display the data.

Initially, an application programming interface (as shown at API call (400)) receives a call for a report. The API response is to generate a macro page, as indicated by bar (402). In this example, the macro page has four hundred rows of information from a relational database, which is too much for the hardware of the client device to display or to display in a manner considered timely by the user of the client device.

Using, e.g., the methods described with respect to FIG. 2 or FIG. 3, the macro page is converted into a tree data structure. A micro page, represented as the first micro page (404), which can display the first one hundred rows of data, is transmitted to the client side. The remaining three hundred rows remain in the memory buffer (406).

When the user scrolls down to review further data, then the system is prompted to generate a second micro page (408) having the next one hundred rows (i.e., rows 101-200). In an embodiment, only the second micro page (408) is displayed, such as when the memory of the client computer is limited. In another embodiment, the second micro page (408) remains renderable on the client side together with the first micro page (404), assuming that only communication bandwidth was the hardware limitation. In this manner, limited communication bandwidth is only used when the client device indicates that additional data should be displayed or transmitted.

The user continues in a similar manner to display the next set of one hundred rows (in third micro page (410)) and the final set of one hundred rows (in fourth micro page (412)). At each stage the buffer size is decreased as information is transmitted in sections to the client device to accommodate the limited hardware bandwidth. After the fourth micro page (412), the memory buffer (406) in this example is empty, all data in the macro page having been transmitted to the client computer.

Optionally, a call for a next macro page (as indicated by arrow (414)) is received. In this case, the process may repeat.

FIG. 5 shows a tree data structure, in accordance with one or more embodiments. The tree data structure (500) may be the primary tree data structure (112) and/or the buffered tree data structure (130) of FIG. 1. The tree data structure (500) of FIG. 5 is, in this example, constructed from a relational database that includes transactions assigned to multiple different categories.

The tree data structure (500) has a root (502). The root (502) is, for example, an identifier of the tree data structure (500). However, the root (502) may also be some other aspect of the data from which the tree data structure (500) is constructed.

Depending from the root (502) are three nodes in a first node level (504) that represent categories: expenses node (506), invoice node (508), and bills node (510). The nodes in the first node level (504) include information that describes the names, nature, and other characteristics of the categories, as represented in text box (512), text box (514), and text box (516). Edges, such as edge (518), edge (520), and edge (522), are data that designate the relationships between the root (502) and the corresponding nodes in the first node level (504) (i.e., expenses node (506), invoice node (508), and bills node (510)).

The nodes in the second node level (524) contain data that describe the transactions associated with the corresponding categories represented by the nodes in the first node level (504). Thus, for example, node (526) and node (528) each represent different transactions categorized under the expenses node (506), which is the "expenses" category. The data contained in the expenses node (526) is shown in text box (530) and the data contained in the node (528) is shown in the text box (532).

The edges between the nodes in the second node level (524) and the first node level (504) specify the relationships between the expenses and the categories. Thus, edge (534) contains data that indicates that the node (526) is a transaction within the expenses category represented by the expenses node (506). Similarly, edge (536) contains data that indicates that the node (528) is another, distinct transaction within the expense category represented by the expenses node (506).

A similar arrangement is present for the remaining nodes in the second node level (524). Thus, node (538) and node (540) are associated to invoice node (508) via edge (542) and edge (544), respectively. Similarly, node (546) and node (548) are associated to bills node (510) via edge (550) and edge (552), respectively.

FIG. 6 and FIG. 7 show alternate data structures useable to store the tree data structure shown in FIG. 5. Thus, table (600) and table (700) are examples of computer-readable structures that may implement some or all of the tree data structure (500) shown in FIG. 5.

The table (600) shows that the tree data structure may be stored in the form of a table that indicates a level order. For example, for the tree data structure (500) of FIG. 5 and assuming a page size of "2", the table (600) may be stored as the buffered tree data structure (130) of FIG. 1. The cache ID column (602) indicates the identity of the buffered tree data structure. The page column (604) indicates the micro page identifier that is presented to the client device. The data for a micro page is then stored in the data column (606).

The table (700) shows that the tree data structure may be stored in the form of a table that uses a depth-first order, but which can be used to fetch data only when the user expands the group. Thus, the table (700) may be a form of the buffered tree data structure (130) of FIG. 1 which further reduces the hardware resource usage of the client device.

The cache identifier column (702) indicates the identity of the buffered tree data structure represented by the table (700). The row number column (704) indicates the identifier of the row for the table (700) and represents a single node in the tree data structure. The parent column (706) represents the identity of the higher level node in the tree data structure. The ID column (708) represents the identifier of the node within a level of the tree data structure. The cells column (710) represents the data contained within the corresponding node in the row number.

Each summary or intermediate group can define the total number of detail rows that participate in it. The request can specify the begin and end row number or the begin row number and maximum number of rows expected in the response. The table (700) can thus support expanded and collapsed views by providing filters on the kind of response expected in the current page.

For example, for a collapsed view, a request can specify that the parent identifier is null, resulting in a return of all the summary lines. In another example, for the expanded view of the expense group, a request can specify the parent identifier equals one. As a result, all the detail line for the expense group can be returned.

Figure 8A:
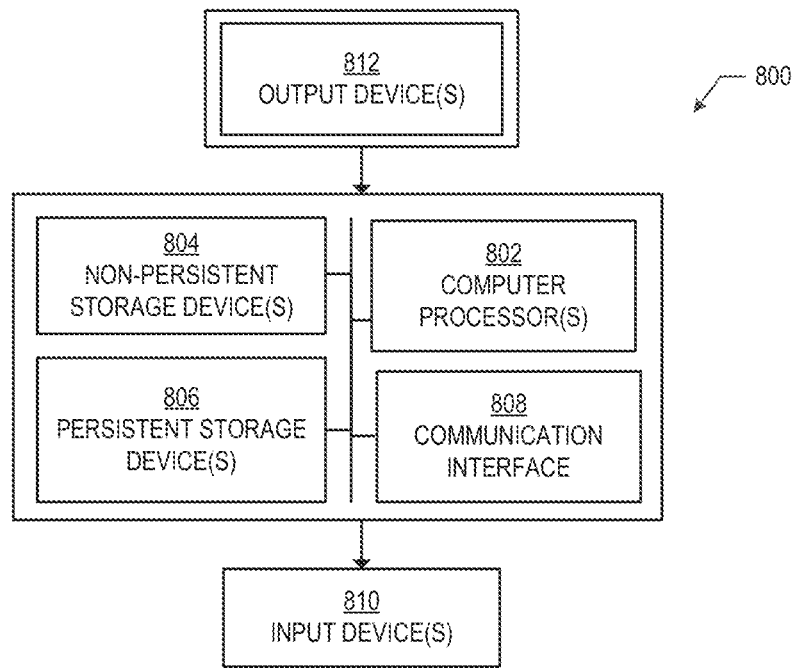
FIG. 8A and FIG. 8B show a computing system and network environment, in accordance with one or more embodiments.
Figure 8B:
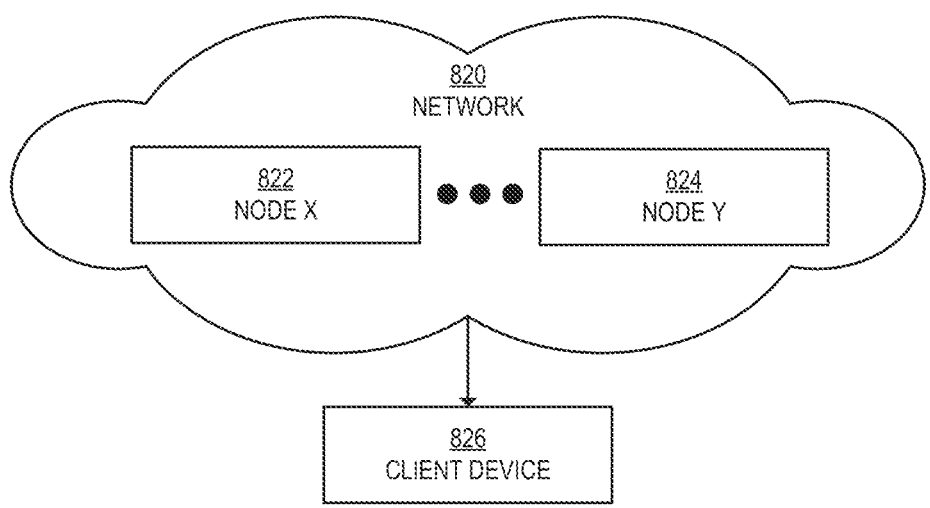

FIG. 8A and FIG. 8B are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 8A, the computing system (800) may include one or more computer processor(s) (802), non-persistent storage device(s) (804) (e.g., volatile memory, such as random access memory (RAM), cache memory, a non-transitory computer readable storage medium, etc.), persistent storage device(s) (806) (e.g., a hard disk, an optical drive such as a compact disk (CD) drive or digital versatile disk (DVD) drive, a flash memory, etc.), a communication interface (808) (e.g., Bluetooth interface, infrared interface, network interface, optical interface, etc.), and numerous other elements and functionalities that implement the features and elements of the disclosure.

The computer processor(s) (802) may be an integrated circuit for processing instructions. For example, the computer processor(s) (802) may be one or more cores or micro-cores of a processor. The computing system (800) may also include one or more input device(s) (810), such as a touchscreen, a keyboard, a mouse, a microphone, a touchpad, an electronic pen, or any other type of input device.

The communication interface (808) may include an integrated circuit for connecting the computing system (800) to a network (not shown) (e.g., a local area network (LAN), a wide area network (WAN) such as the Internet, a mobile network, or any other type of network) and/or to another device, such as another computing device.

Further, the computing system (800) may include one or more output device(s) (812), such as a screen (e.g., a liquid crystal display (LCD), a plasma display, a touchscreen, a cathode ray tube (CRT) monitor, a projector, or other display device), a printer, an external storage, or any other output device. One or more of the output device(s) (812) may be the same or different from the input device(s) (810). The input and output device(s) (810 and 812) may be locally or remotely connected to the computer processor(s) (802), the non-persistent storage device(s) (804), and the persistent storage device(s) (806). Many different types of computing systems exist, and the aforementioned input and output device(s) (810 and 812) may take other forms.

Software instructions in the form of computer readable program code to perform the one or more embodiments may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform the one or more embodiments.

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system (800) shown in FIG. 8A, or a group of nodes combined may correspond to the computing system (800) shown in FIG. 8A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (800) may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system (800) shown in FIG. 8A. Further, the client device (826) may include and/or perform all or a portion of the one or more embodiments.

The computing system (800) or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing the one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the one or more embodiments, may extract one or more data items from the obtained data. For example, the extraction may be performed as follows by the computing system (800) in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (800) of FIG. 8A, while performing the one or more embodiments, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (800) in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (800) of FIG. 8A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (800) of FIG. 8A and the nodes (e.g., node X (822), node Y (824)) and/or client device (826) in FIG. 8B. Other functions may be performed using one or more embodiments.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A method comprising:
receiving a request for a report on a data set;
providing the report, wherein the report comprises a macro page comprising a subset of the data set;
converting the macro page into a primary tree data structure comprising a plurality of levels;
buffering the primary tree data structure in a buffer to form a buffered tree data structure, wherein the buffered tree data structure is buffered in a level order of the plurality of levels;
selecting a first micro page from the buffered tree data structure, wherein the first micro page is configured for display on a user interface; and
transmitting, to the user interface, the first micro page.

2. The method of claim 1, further comprising:
inferring, automatically, a user intent from the request; and
selecting the first micro page at least based on the user intent.

3. The method of claim 1, wherein:
the first micro page comprises a subset of the buffered tree data structure, and
a size of the subset is selected to be processed by a processor within a predefined time period.

4. The method of claim 1, further comprising:
receiving a request to display a second micro page from the macro page;
retrieving, from the buffer, the second micro page; and
transmitting the second micro page to the user interface.

5. The method of claim 4, wherein receiving the request to display the second micro page comprises at least one of:
receiving a command to scroll past the first micro page on the user interface; and
receiving a request to expand information displayed on the first micro page.

6. The method of claim 1, wherein converting comprises:
receiving a plurality of categorizations, wherein the plurality of categorizations comprise corresponding pluralities of records from the data set;
designating an identifier of the report as a root;
designating the plurality of categorizations as a first level of the buffered tree data structure depending from the root; and
designating the corresponding pluralities of records as a second level of the buffered tree data structure depending from the plurality of categorizations.

7. The method of claim 1, wherein the report comprises a plurality of records from the data set, and wherein converting comprises:
generating a plurality of categorizations from the plurality of records, wherein a categorization from the plurality of categorizations comprises a corresponding record;
designating an identifier of the report as a root;
designating the plurality of categorizations as a first level of the buffered tree data structure depending from the root; and
designating the pluralities of records as a second level of the buffered tree data structure depending from the first level.

8. The method of claim 1, wherein the data set is stored as a relational database.

9. A system comprising:
a processor;
a memory comprising:
a buffer, in communication with the processor, and
a buffered tree data structure comprising a primary tree data structure with a plurality of levels, wherein the buffered tree data structure is buffered in a level order of the plurality of levels;
a data repository, in communication with the processor, and comprising:
a report comprising a macro page comprising a subset of a data set, and
a first micro page formed from the buffered tree data structure, wherein the first micro page is configured for display on a user interface;
a pagination engine configured to:
receive a request for the report on a data set;
provide the report;
convert the macro page into the primary tree data structure;
buffer the primary tree data structure in the buffer to form the buffered tree data structure;
select the first micro page from the buffered tree data structure; and
transmit, to a user interface, the first micro page.

10. The system of claim 9, further comprising:
a user intent engine configured to infer, automatically, a user intent from the request; and
wherein the pagination engine is further configured to receive the user intent and select the first micro page at least based on the user intent.

11. The system of claim 9, wherein:
the first micro page comprises a subset of the buffered tree data structure, and
a size of the subset is selected to be processed by the processor within a predefined time period.

12. The system of claim 9, wherein the pagination engine is further configured to:
receive a request to display a second micro page from the macro page;
retrieve, from the buffer, the second micro page; and
display the second micro page.

13. The system of claim 12, wherein receiving the request to display the second micro page comprises at least one of:
receiving a command to scroll past the first micro page on the user interface; and
receiving a request to expand information displayed on the first micro page.

14. The system of claim 9, wherein converting comprises:
receiving a plurality of categorizations, wherein the plurality of categorizations comprise corresponding pluralities of records from the data set;
designating an identifier of the report as a root;
designating the plurality of categorizations as a first level of the buffered tree data structure depending from the root; and
designating the corresponding pluralities of records as a second level of the buffered tree data structure depending from the plurality of categorizations.

15. The system of claim 9, wherein the report comprises a plurality of records from the data set, and wherein converting comprises:
generating a plurality of categorizations from the plurality of records, wherein a categorization from the plurality of categorizations comprises a corresponding record;
designating an identifier of the report as a root;
designating the plurality of categorizations as a first level of the buffered tree data structure depending from the root; and designating the pluralities of records as a second level of the buffered tree data structure depending from the first level.

16. The system of claim 9, wherein the data set is stored as a relational database in the data repository.

17. A non-transitory computer readable storage medium storing program code which, when executed by a processor, performs a computer-implemented method comprising:
   receiving a request for a report on a data set;
   providing the report, wherein the report comprises a macro page comprising a subset of the data set;
   converting the macro page into a primary tree data structure comprising a plurality of levels;
   buffering the primary tree data structure in a buffer to form a buffered tree data structure, wherein the buffered tree data structure is buffered in a level order of the plurality of levels;
   selecting a first micro page from the buffered tree data structure, wherein the first micro page is configured for display on a user interface; and
   transmitting, to the user interface, the first micro page.

18. The non-transitory computer readable storage medium of claim 17, wherein the computer-implemented method further comprises:
   inferring, automatically, a user intent from the request; and
   selecting the first micro page at least based on the user intent.

19. The non-transitory computer readable storage medium of claim 17, wherein:
   the first micro page comprises a subset of the buffered tree data structure, and
   a size of the subset is selected to be processed by a processor within a predefined time period.

20. The non-transitory computer readable storage medium of claim 17, wherein, in the computer-implemented method, converting comprises:
   receiving a plurality of categorizations, wherein the plurality of categorizations comprise corresponding pluralities of records from the data set;
   designating an identifier of the report as a root;
   designating the plurality of categorizations as a first level of the buffered tree data structure depending from the root; and
   designating the corresponding pluralities of records as a second level of the buffered tree data structure depending from the plurality of categorizations.

* * * * *